US012634404B2

(12) United States Patent
Hotta et al.

(10) Patent No.: US 12,634,404 B2
(45) Date of Patent: May 19, 2026

(54) INFORMATION PROCESSING APPARATUS AND METHOD, INFORMATION PROCESSING SYSTEM, AND NON-TRANSITORY COMPUTER READABLE MEDIUM FOR CALCULATING A FEE BASED ON SEQUENTIAL PROCESSING

(71) Applicant: FUJIFILM Business Innovation Corp., Tokyo (JP)

(72) Inventors: Keiichi Hotta, Kanagawa (JP); Kensaku Masuda, Kanagawa (JP); Haruko Kawano, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 0 days.

(21) Appl. No.: 18/178,049

(22) Filed: Mar. 3, 2023

(65) Prior Publication Data

US 2024/0098206 A1 Mar. 21, 2024

(30) Foreign Application Priority Data

Sep. 21, 2022 (JP) ................................. 2022-150260

(51) Int. Cl.
*H04N 1/34* (2006.01)

(52) U.S. Cl.
CPC ............. *H04N 1/344* (2013.01); *H04N 1/346* (2013.01)

(58) Field of Classification Search
None
See application file for complete search history.

(56) References Cited

U.S. PATENT DOCUMENTS

2017/0070642 A1* 3/2017 Miyamoto ............... B41J 29/38

FOREIGN PATENT DOCUMENTS

JP 2006-195893 A 7/2006

* cited by examiner

*Primary Examiner* — Lennin R Rodriguezgonzalez
(74) *Attorney, Agent, or Firm* — Oliff PLC

(57) ABSTRACT

An information processing apparatus includes a processor configured to: receive sequential processing to be executed, the sequential processing being processing for executing multiple preset operations which are related to each other; send a request to execute an operation included in the received sequential processing and receive an execution result; and calculate a fee, which is preset, in accordance with a degree of success of the executed operation indicated by the execution result and present the calculated fee.

8 Claims, 8 Drawing Sheets

FIG. 4

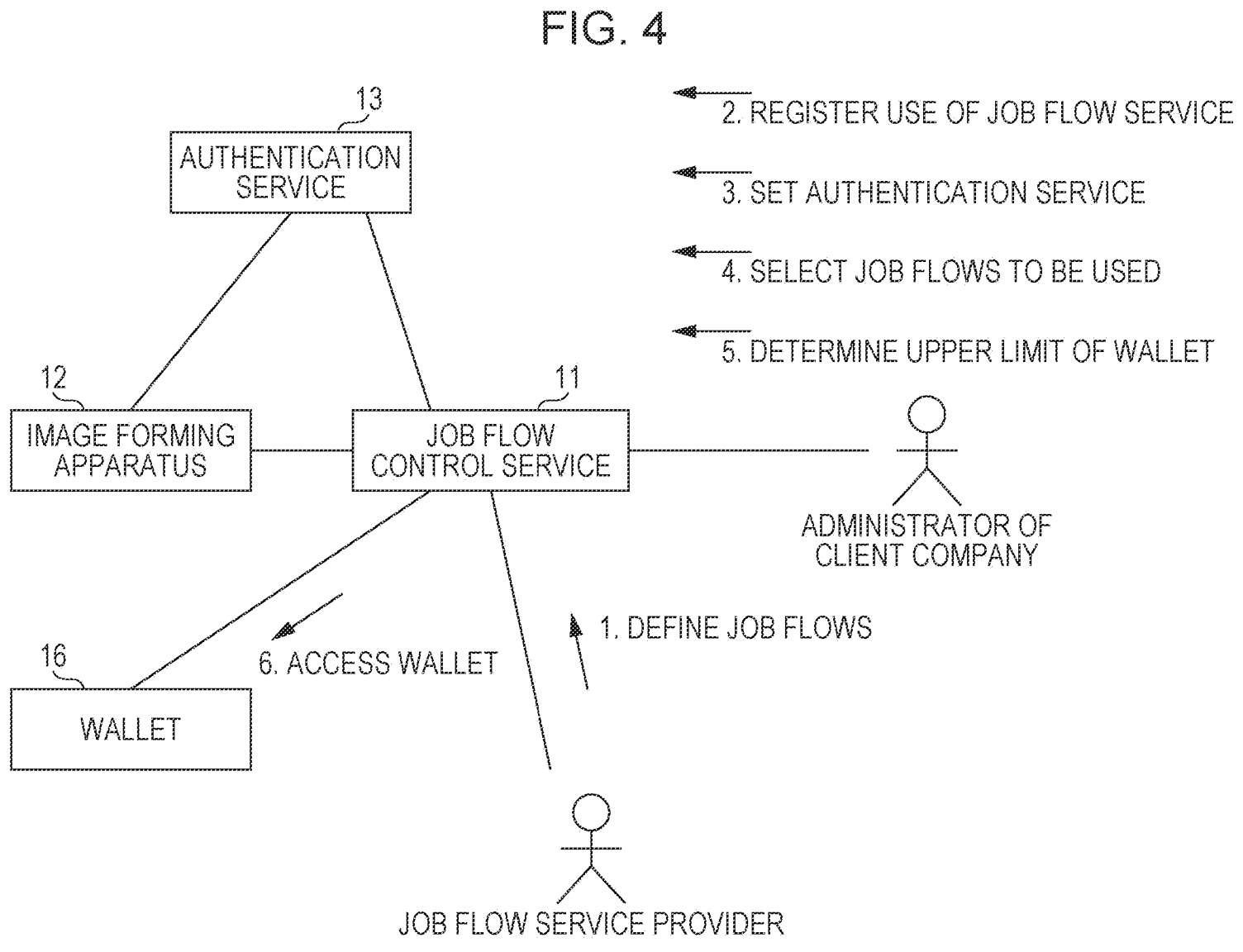

2. REGISTER USE OF JOB FLOW SERVICE

3. SET AUTHENTICATION SERVICE

4. SELECT JOB FLOWS TO BE USED

5. DETERMINE UPPER LIMIT OF WALLET

ADMINISTRATOR OF CLIENT COMPANY

1. DEFINE JOB FLOWS

JOB FLOW SERVICE PROVIDER

13 AUTHENTICATION SERVICE

11 JOB FLOW CONTROL SERVICE

12 IMAGE FORMING APPARATUS

6. ACCESS WALLET

16 WALLET

FIG. 7

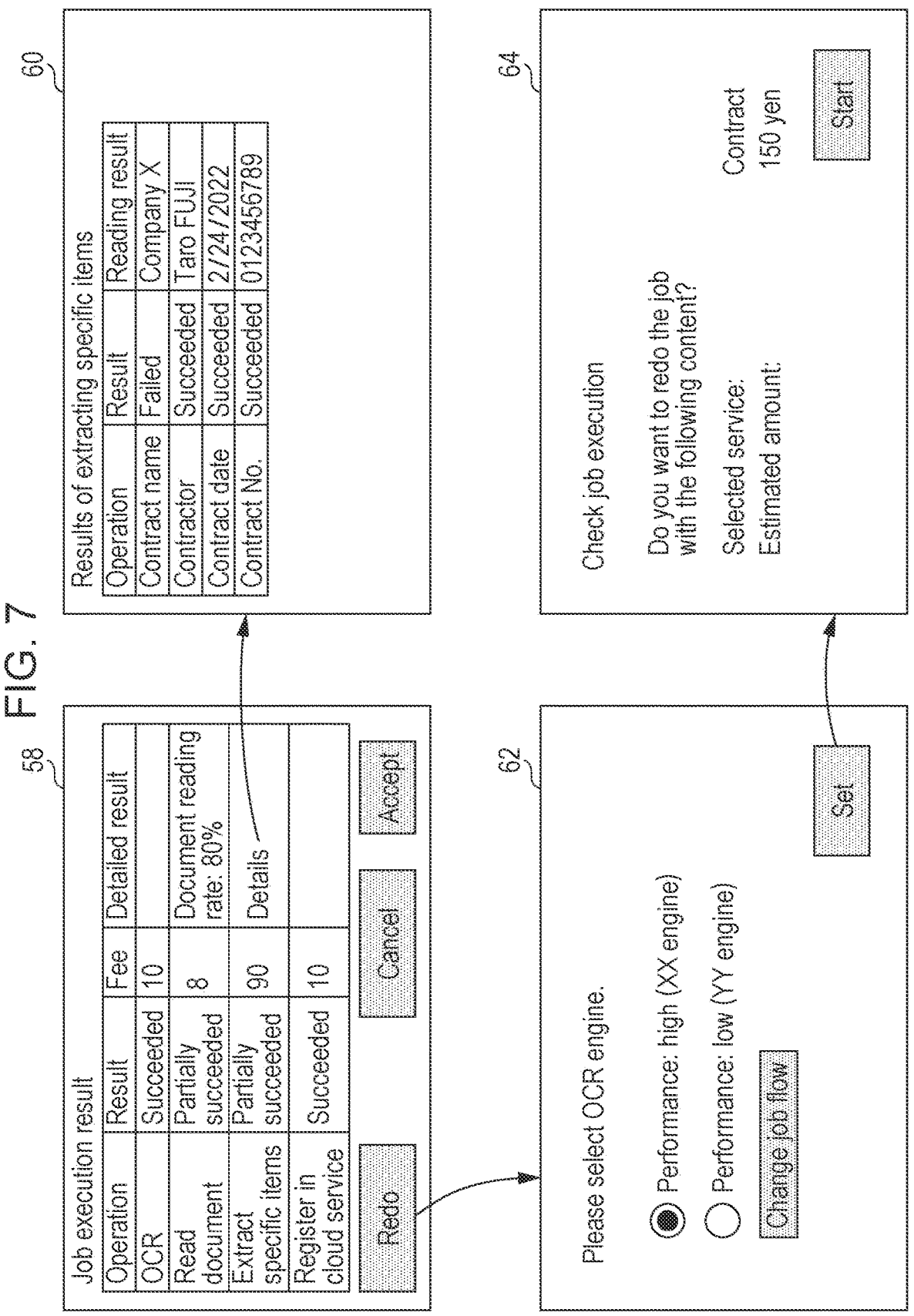

58 — Job execution result

| Operation | Result | Fee | Detailed result |
|---|---|---|---|
| OCR | Succeeded | 10 | |
| Read document | Partially succeeded | 8 | Document reading rate: 80% |
| Extract specific items | Partially succeeded | 90 | Details |
| Register in cloud service | Succeeded | 10 | |

Redo    Cancel    Accept

60 — Results of extracting specific items

| Operation | Result | Reading result |
|---|---|---|
| Contract name | Failed | Company X |
| Contractor | Succeeded | Taro FUJI |
| Contract date | Succeeded | 2/24/2022 |
| Contract No. | Succeeded | 0123456789 |

62

Please select OCR engine.

● Performance: high (XX engine)

○ Performance: low (YY engine)

Change job flow

Set

64

Check job execution

Do you want to redo the job with the following content?

Selected service:    Contract

Estimated amount:    150 yen

Start

INFORMATION PROCESSING APPARATUS AND METHOD, INFORMATION PROCESSING SYSTEM, AND NON-TRANSITORY COMPUTER READABLE MEDIUM FOR CALCULATING A FEE BASED ON SEQUENTIAL PROCESSING

CROSS-REFERENCE TO RELATED APPLICATIONS

This application is based on and claims priority under 35 USC 119 from Japanese Patent Application No. 2022-150260 filed Sep. 21, 2022.

BACKGROUND

(i) Technical Field

The present disclosure relates to an information processing apparatus and method, an information processing system, and a non-transitory computer readable medium.

(ii) Related Art

Japanese Unexamined Patent Application Publication No. 2006-195893 discloses the following job flow service system. A job flow service device creates an instruction, generates charging information based on the amount of input money, and sends the charging information to a multifunction device. The multifunction device performs scanning processing in accordance with the instruction, subtracts the amount of money for the scanning processing from the amount indicated by the charging information, sends scan data, the instruction, and the charging information to an image processing device. A file management device stores a PDF file in accordance with the instruction and subtracts the amount of money for the storage of the PDF file from the amount indicated by the charging information, and sends the charging information, together with notification that the job flow has finished, to the job flow service device. The job flow service device checks from the charging information whether there is any change to be returned, and if any, it sends information on the presence of change to a PC.

SUMMARY

When a user is charged for the execution of sequential processing, which is processing for sequentially executing multiple preset operations related to each other, a fee is simply calculated regardless of the degree of success of the processing indicated by a processing result. Hence, the user may not always be satisfied with the fee charged for the processing.

Aspects of non-limiting embodiments of the present disclosure relate to an information processing apparatus and method, an information processing system, and a non-transitory computer readable medium that can make it more likely for a user to be satisfied with a fee charged for sequential processing, compared with a case in which a user is charged for sequential processing regardless of the degree of success of the processing indicated by a processing result.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive sequential processing to be executed, the sequential processing being processing for executing multiple preset operations which are related to each other; send a request to execute an operation included in the received sequential processing and receive an execution result; and calculate a fee, which is preset, in accordance with a degree of success of the executed operation indicated by the execution result and present the calculated fee.

BRIEF DESCRIPTION OF THE DRAWINGS

An exemplary embodiment of the present disclosure will be described in detail based on the following figures, wherein:

FIG. 4 is a schematic diagram for explaining preparation steps for using a job flow service;

FIG. 7 illustrates examples of screens to be displayed for checking an execution result of a job flow.

DETAILED DESCRIPTION

Figure 1:
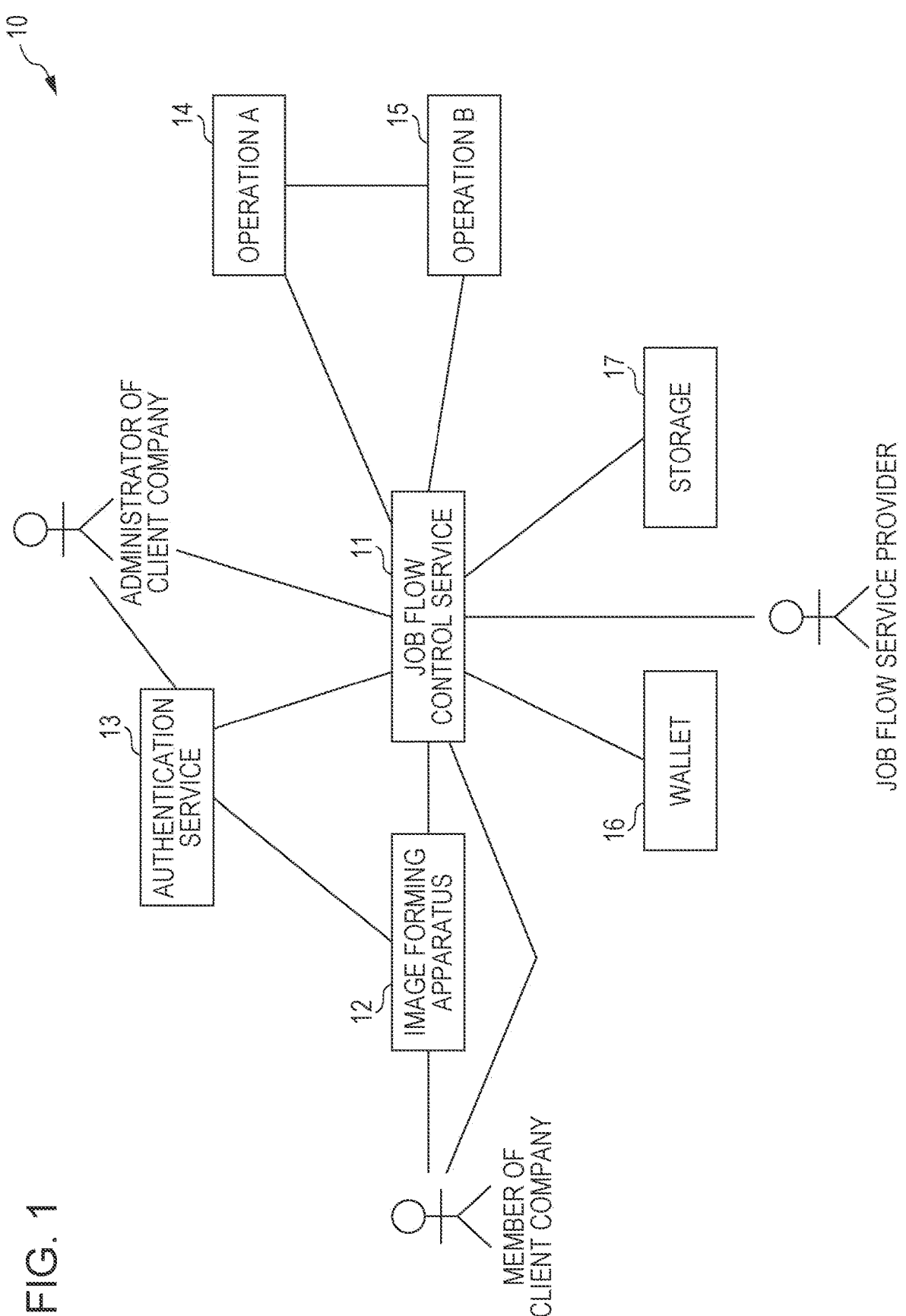
FIG. 1 is a schematic diagram illustrating the configuration of an information processing system according to the exemplary embodiment.

An exemplary embodiment of the disclosure will be described below in detail with reference to the accompanying drawings. FIG. 1 is a schematic diagram illustrating the configuration of an information processing system 10 according to the exemplary embodiment.

The information processing system 10 performs operations for reading a document and for processing the read document based on a job flow and charges for the individual operations in accordance with the results of the operations. A job flow is sequential processing for sequentially executing multiple preset operations which are related to each other. In the disclosure, a job is an operation or a set of operations executed by an image forming apparatus 12 or a cloud service, for example, to implement a predetermined function.

As illustrated in FIG. 1, the information processing system 10 according to the exemplary embodiment includes a job flow control service 11, an image forming apparatus 12, which is an example of a requesting device, an authentication service 13, an operation A 14, an operation B 15, a wallet 16, and a storage 17.

The job flow control service 11 provides a job flow as a service. The job flow control service 11 implements various functions. Examples of the major functions implemented by the job flow control service 11 are defining of a job flow to be provided to a client, management of clients, presenting of a list of available job flows, calculating of a fee to be charged based on a list of job flow execution results, and informing a user of a job flow result and executing of final processing.

The function of defining of a job flow includes, for each operation forming the job flow, a setting of a standard fee to be charged when the operation has completely succeeded and a setting of a discount to be offered based on the standard fee.

The function of managing of clients includes, for each client company, issuing of an account and setting of an authentication service and a wallet to be used in sequential processing.

The function of presenting of a list of available job flows is the following function. When a request for a list of job flows is received from the image forming apparatus 12, for example, the job flow control service 11 sends a query to the authentication service 13 based on an authentication token, identifies a client company from certain information, such as company information, returned from the authentication service 13, and returns a list of the corresponding job flows to the image forming apparatus 12.

The function of calculating of a fee from a list of job flow execution results is to calculate a fee based on the result of each of the executed operations.

The function of informing a user of a job flow result and executing of final processing is the following function. The job flow control service 11 informs a user of a job flow result when the job flow has been completed and asks the user to select from "accept", "cancel", and "redo" based on the job flow result. The job flow control service 11 executes the following processing based on a reply from the user.

If "accept" is selected, the job flow control service 11 stores the execution result of the job flow in the storage 17, finalizes the fee, and finishes the processing.

If "cancel" is selected, the job flow control service 11 discards the execution result of the job flow and terminates the processing.

If "redo" is selected, the job flow control service 11 presents alternative parameters of the job flow to a user and restarts from a corresponding operation of the job flow.

The image forming apparatus 12 allows a user to perform operations, such as selecting of a job flow. The image forming apparatus 12 communicates with the job flow control service 11 to obtain a list of job flows and also communicates with the authentication service 13 to perform an authentication operation. The image forming apparatus 12 also reads a document and sends the read document in accordance with a job flow defined by the job flow control service 11.

The authentication service 13 provides an authentication function required for using a job flow service. When user authentication is performed, the authentication service 13 issues an authentication token and makes it possible to identify a user and to use a job flow service based on the issued authentication token.

An operation N, such as the operation A 14 and the operation B 15, executes predetermined processing defined by a job flow. For example, the operation N performs optical character recognition/reader (OCR) processing, extracts specific items, such as the invoice number, from the OCR result, accesses an application programming interface (API) of the storage 17, and creates a record, for example. Each operation N interprets a job flow defined by the job flow control service 11, executes processing based on the content of processing that the operation N is supposed to execute, and updates the operation result (which indicates the degree of success, such as "85% succeeded" and the content of OCR data, for example). After updating the operation result, the operation N sends the job flow and the operation result to the subsequent operation and also requests it to execute the corresponding processing in accordance with the definition of the job flow.

In the information processing system 10 according to the exemplary embodiment, services provided by a cloud server, for example, are used as the job flow control service 11, authentication service 13, operation A 14, operation B 15, wallet 16, and storage 17. In this case, services provided by different cloud servers or services provided by a single cloud server may be used as the job flow control service 11, authentication service 13, operation A 14, operation B 15, wallet 16, and storage 17. Alternatively, some of the job flow control service 11, authentication service 13, operation A 14, operation B 15, wallet 16, and storage 17 may be services provided by different cloud servers.

Figure 2:
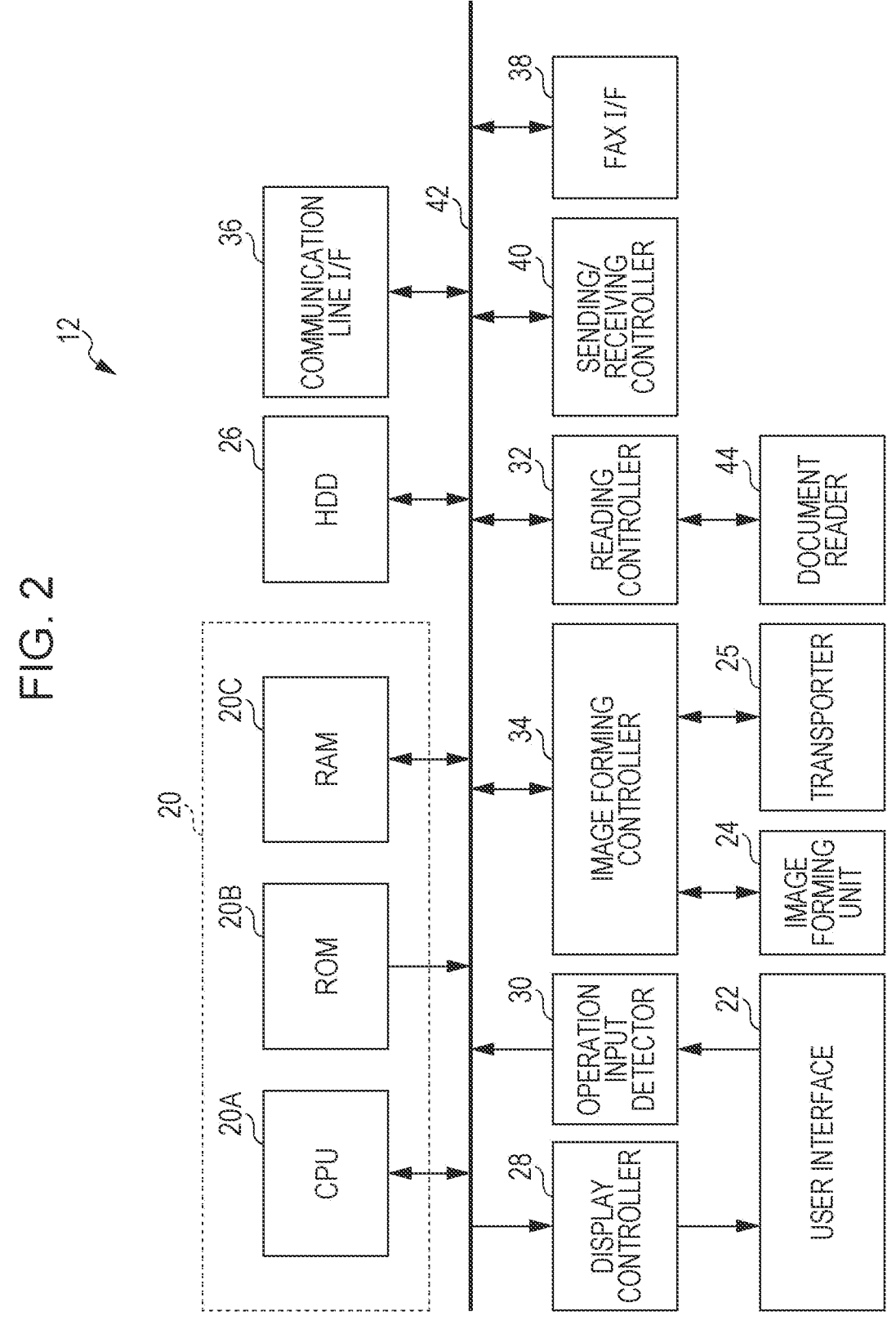
FIG. 2 is a block diagram illustrating major parts of the electrical configuration of an image forming apparatus in the information processing system according to the exemplary embodiment.

The configuration of the image forming apparatus 12 will be discussed below. FIG. 2 is a block diagram illustrating major parts of the electrical configuration of the image forming apparatus 12 in the information processing system 10 according to the exemplary embodiment.

As illustrated in FIG. 2, the image forming apparatus 12 includes a control unit 20 having a central processing unit (CPU) 20A, a read only memory (ROM) 20B, and a random access memory (RAM) 20C. The CPU 20A controls the entire operation of the image forming apparatus 12. The RAM 20C is used as a work area, for example, for the CPU 20A to execute various programs. In the ROM 20B, various control programs and various parameters, for example, are prestored. In the image forming apparatus 12, the CPU 20A, the ROM 20B, and the RAM 20C of the control unit 20 are electrically connected to each other via a system bus 42.

The image forming apparatus 12 includes a hard disk drive (HDD) 26, a display controller 28, and an operation input detector 30. The HDD 26 stores various types of data and application programs. The display controller 28 is connected to a user interface 22 to control the displaying of various screens, such as operation screens, on a display of the user interface 22. The operation input detector 30 is also connected to the user interface 22 to detect an operation instruction input via the user interface 22. In the image forming apparatus 12, the HDD 26, the display controller 28, and the operation input detector 30 are electrically connected to the system bus 42. Although the HDD 26 is used as a storage device in the image forming apparatus 12 of the exemplary embodiment, another non-volatile storage, such as a flash memory, may alternatively be used as the storage device.

The image forming apparatus 12 also includes a reading controller 32 and an image forming controller 34. The reading controller 32 controls an optical image-reading operation performed by a document reader 44 and a document feeding operation performed by a document feeder. The image forming controller 34 controls image forming processing executed by an image forming unit 24 and an operation of transporting of a sheet to the image forming unit 24 performed by a transporter 25. The image forming apparatus 12 also includes a communication line interface (communication line I/F) 36, a fax interface (fax I/F) 38, and a sending/receiving controller 40. The communication line I/F 36 is connected to various communication lines and sends and receives communication data to and from external devices, such as a cloud server 18 (see FIG. 3), connected to the communication lines. The fax I/F 38 is connected to a telephone line (not shown) and sends and receives fax data to and from a fax device connected to the telephone line. The sending/receiving controller 40 controls sending/receiving of fax data performed via the fax I/F 38. In the image forming apparatus 12, the sending/receiving controller 40, reading controller 32, image forming controller 34, communication line I/F 36, and fax I/F 38 are electrically connected to the system bus 42.

With the above-described configuration, by using the CPU 20A, the image forming apparatus 12 makes access to each of the RAM 20C, the ROM 20B, and the HDD 26. By using the CPU 20A, the image forming apparatus 12 also performs various control operations for, for example: displaying of operation screens and information, such as various messages, on the display of the user interface 22 via the display controller 28; activation of the document reader 44 and the document feeder via the reading controller 32; activation of the image forming unit 24 and the transporter 25 via the image forming controller 34; sending/receiving of communication data via the communication line I/F 36; and sending/receiving of fax data via the fax I/F 38 under the control of the sending/receiving controller 40. By using the CPU 20A, the image forming apparatus 12 also identifies the content of operation performed on the user interface 22, based on operation information detected by the operation input detector 30, and then performs various control operations based on the identified content of operation.

Figure 3:
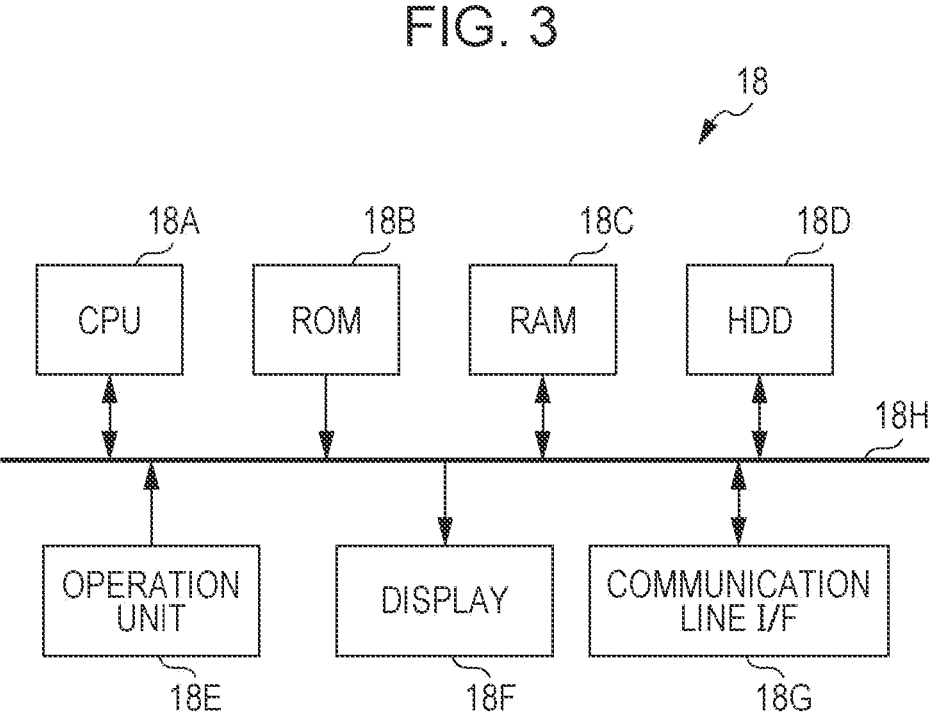
FIG. 3 is a block diagram illustrating major parts of the electrical configuration of a cloud server in the information processing system according to the exemplary embodiment.

The configuration of a cloud server for providing a cloud service, such as the job flow control service 11, authentication service 13, operation A 14, operation B 15, wallet 16, and storage 17, will be discussed below. FIG. 3 is a block diagram illustrating major parts of the electrical configuration of a cloud server 18 in the information processing system 10 according to the exemplary embodiment. A single cloud server 18 or plural cloud servers 18 may be provided. An explanation will be given only of the configuration of a typical cloud server 18 since the configurations of all the cloud servers 18 are similar.

As illustrated in FIG. 3, the cloud server 18 in the exemplary embodiment includes a CPU 18A, a ROM 18B, a RAM 18C, an HDD 18D, an operation unit 18E, a display 18F, and a communication line interface (I/F) 18G. The CPU 18A controls the entire operation of the cloud server 18. In the ROM 18B, various control programs and various parameters, for example, are prestored. The RAM 18C is used as a work area, for example, for the CPU 18A to execute various programs. In the HDD 18D, various types of data and application programs, for example, are stored. The operation unit 18E, which is constituted by a keyboard and a mouse, for example, is used for inputting various items of information. The display 18F is used for displaying various items of information. The communication line I/F 18G is connected to various communication lines and sends and receives various types of data to and from other devices connected to the communication lines. The above-described elements of the cloud server 18 are electrically connected to each other via a system bus 18H. Although the HDD 18D is used as a storage device in the cloud server 18 in the exemplary embodiment, another non-volatile storage, such as a flash memory, may alternatively be used as the storage device.

With the above-described configuration, by using the CPU 18A, the cloud server 18 makes access to each of the ROM 18B, the RAM 18C, and the storage 18D. By using the CPU 18A, the cloud server 18 also obtains various types of data via the operation unit 18E, displays various items of information on the display 18F, and performs control to send and receive communication data via the communication line I/F 18G.

In the exemplary embodiment, the CPU 18A executes an information processing program stored in the ROM 18B or the HDD 18D so as to function as the job flow control service 11. The job flow control service 11 then receives a job flow to be executed as sequential processing, which is processing for executing multiple preset operations related to each other, sends a request to execute an operation included in the job flow, receives an execution result, calculates a fee, which is preset, in accordance with the degree of success of the executed operation indicated by the execution result, and presents the calculated fee.

Preparation steps for using a job flow service will be explained below with reference to FIG. 4.

A description will be given, assuming that a job flow service provider creates a job flow and also sets a fee and a discount rate for each of the operations included in the job flow, the administrator of a client company selects available job flows and creates a wallet for charging, and a member (user) of the client company selects a job flow to be used and executes the job flow. The member of the client company receives a result of the job flow and accepts the result if he/she is satisfied with the result. Then, a fee for the execution of the job flow is determined. If the member of the client company is not satisfied with the result, he/she determines whether to redo part of the job flow or to cancel the job flow.

Preparations for using the job flow service are conducted in accordance with steps 1. to 6. shown in FIG. 4.

1. The job flow service provider defines some job flows in advance. The job flow service provider sets a charging rule for each of the operations included in a job flow. For each job flow, the job flow service provider sets a standard fee, which is a fee to be charged when a user is satisfied with a result, and also sets a discount condition in the following manner, for example. In the case of OCR processing of a document, for example, if the OCR result indicates that part of the read document does not make sense as a natural language, the ratio of this part to the entire document is set to be a discount rate. The amount calculated based on the discount rate is subtracted from the standard fee to determine the final fee.

To enhance the precision of OCR processing, for example, the job flow service provider receives feedback from users. If a user finds an error in the result of a job flow displayed on a screen, he/she can report such an error as feedback on the same screen. A user having given feedback can get a discount in return. The job flow service provider presets a discount rate used for feedback.

2. The administrator of the client company registers the use of a job flow service in the job flow control service 11.

3. The administrator sets an authentication service 13 to be used for authentication to use the job flow service.

4. The administrator selects job flows to be used from the job flows defined by the job flow service provider.

5. The administrator determines a payment method, such as a credit card, and sets the upper limit of a wallet that the company can spend.

6. The job flow control service 11 accesses a wallet based on the information generated by the administrator.

Figure 5:
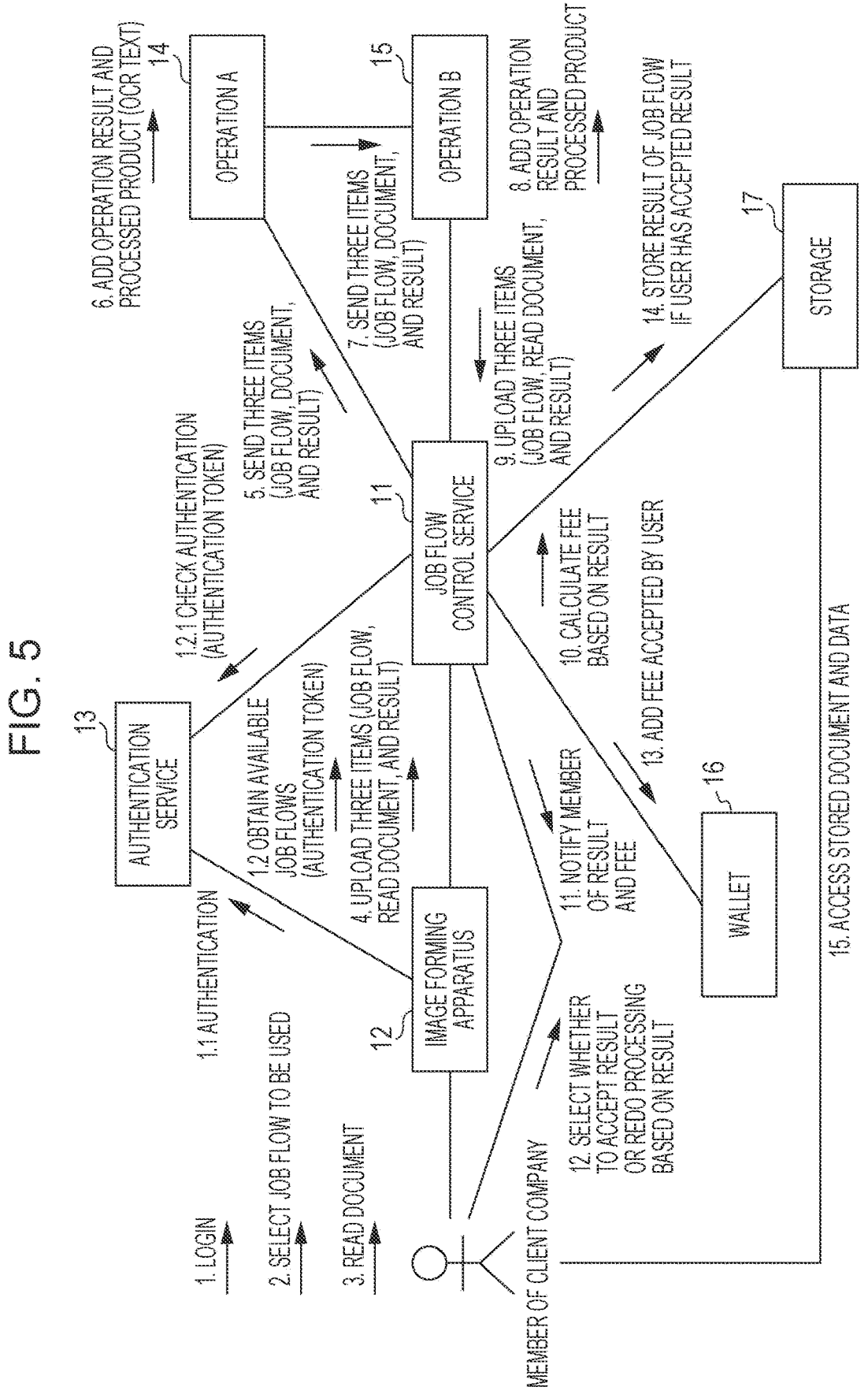
FIG. 5 is a schematic diagram for explaining a procedure for using a job flow service.

A procedure for using a job flow service will be described below with reference to FIG. 5.

1. A member (user) of a client company performs a login operation to use a job flow service by operating the user interface 22 of the image forming apparatus 12.

1.1 The image forming apparatus 12 receives the login operation and performs authentication with the authentication service 13.

1.2 The image forming apparatus 12 obtains available job flows linked with user information from the job flow control service 11 by using an authentication token.

1.2.1 The job flow control service 11 returns the job flows linked with the user information, together with the authentication token, to the image forming apparatus 12 via the authentication service 13.

Figure 6:
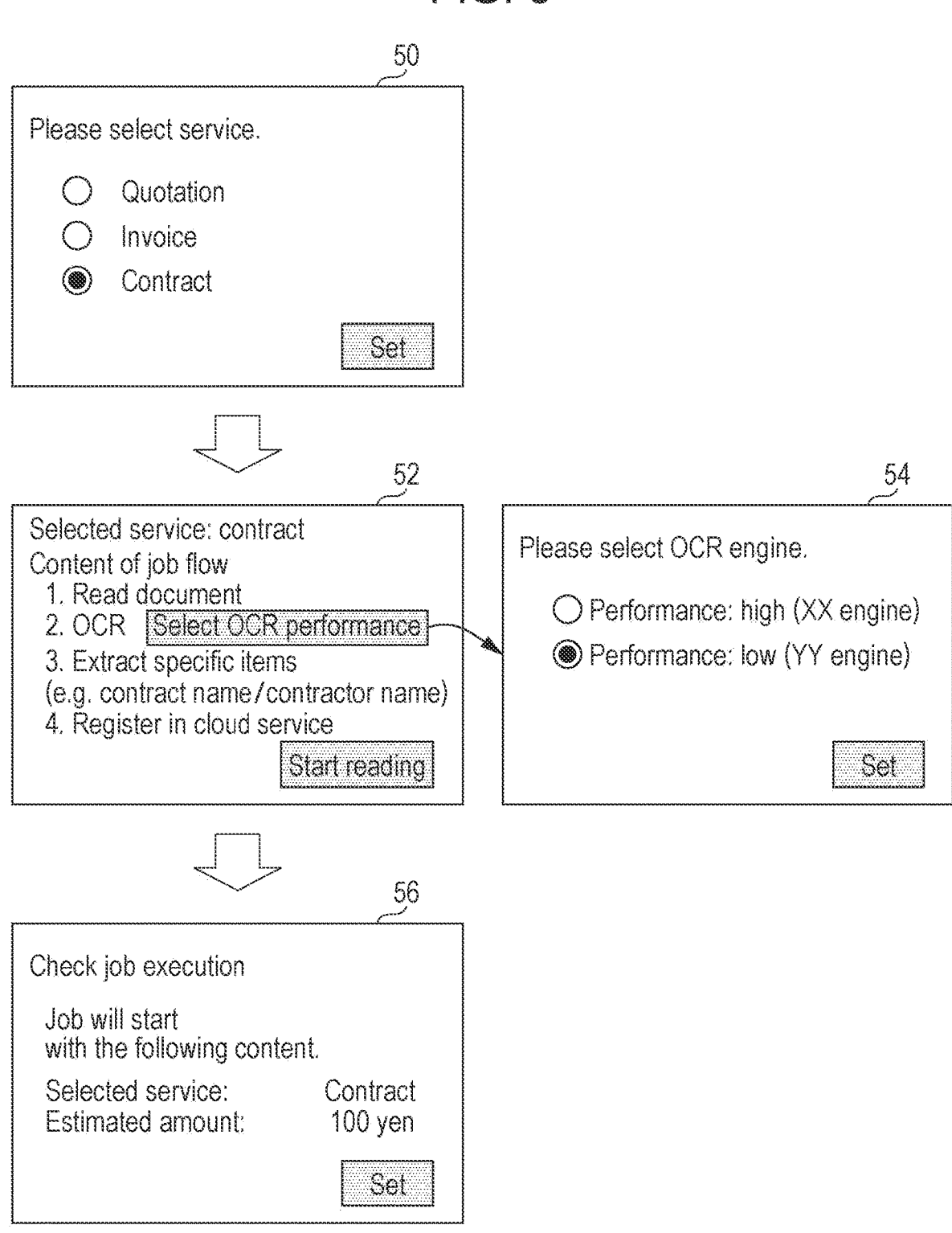
FIG. 6 illustrates examples of screens to be displayed for using a job flow service.

2. The member of the client company (hereinafter may also be simply called the member or the user) selects a job flow to be used from the job flows sent from the job flow control service 11. At this time, the member also selects an option, such as a high-cost, high-performance OCR service. For example, as illustrated in FIG. 6, a selection screen 50 for selecting one of registered job flows is displayed, and the member selects a job flow to be used on the selection screen 50. In the example in FIG. 6, the member selects a contract among a quotation, an invoice, and a contract. When "set" is selected on the selection screen 50, a setting screen 52 for setting the content of the job flow is displayed. If "select OCR performance" is selected, an option selection screen 54 is displayed. If "start reading" is selected on the setting screen 52, a job execution checking screen 56 is displayed. If "set" is selected on the job execution checking screen 56, the job flow is started.

3. The member starts reading a document to be used for the job flow by operating the image forming apparatus 12.

4. After reading the document, the image forming apparatus 12 sends the job flow as an instruction, an processed product, such as a read document or an OCR result, and an operation result (which indicates the degree of success, such as "85% succeeded", for example) to the job flow control service 11 in accordance with the job flow. In this example, as the processed product, the image forming apparatus 12 sends the read document to the job flow control service 11. In the following steps of the job flow, processing is executed using the above-described three items, that is, the job flow, processed product, and operation result.

5. The job flow control service 11 sends the job flow, processed product (document), operation result to the next operation and requests it to perform the corresponding processing in accordance with the received job flow.

6. to 9. Upon receiving the job flow, document, and operation result, the operation N (operation A 14 and operation B 15 in FIG. 5) performs processing based on the content of the job flow. The operation N then updates the received operation result by reflecting the operation result generated by the operation N and adds output of the operation to the processed product and requests the next operation to perform the corresponding processing. This cycle is repeated until the end of the job flow.

10. After the end of the job flow, for each operation N, the job flow control service 11 calculates a fee based on the result of operation N and the discount condition.

11. The job flow control service 11 notifies by email, for example, the member of the client company of the completion of processing, together with the fee for the job flow.

12. The member checks the result on a screen, such as that shown in FIG. 7, and responds in one of the following manners.

The member accepts the result of the job flow and agrees to pay the fee. For example, the member selects "accept" on a job execution result screen 58 shown in FIG. 7.

If the member is not satisfied with the result, the job flow is re-executed in a different manner. The member determines whether to entirely or partially re-execute the job flow. If the job flow is partially re-executed, the corresponding part of the job flow is changed. For example, on the job execution result screen 58 in FIG. 7, if the results of some operations indicate "succeeded" and the results of some operations indicate "partially succeeded" or "failed", the member can check a specific item result screen 60 in FIG. 7 by selecting "details" corresponding to the operation result "failed" or "partially succeeded" on the job execution result screen 58. If the member is not satisfied with the result indicated on the specific item result screen 60, he/she selects "redo" on the job execution result screen 58 so as to display a proposed-alternative screen 62. On the proposed-alternative screen 62, the member gives an instruction to re-execute the job flow by selecting a high-cost, high-performance OCR operation, for example. In the example in FIG. 7, "performance: high" is selected. If "set" is operated on the proposed-alternative screen 62, a job execution checking screen 64 is displayed. On the job execution checking screen 64, a fee is displayed. If "start" is selected, the job flow is re-executed.

If a result of extracted data, such as text data, is obtained, a user manually makes a correction to the result on the same screen on which the result is displayed. At this time, the user reports the content of correction to the developer of the job flow or displays a screen for inputting the content of correction. If the user has reported the content of correction, a reward is given to the user, and more specifically, the amount of money is calculated based on the discount rate preset by the job flow service provider and is subtracted from the standard fee or points that the user can use in future are granted to the user.

If the member is not satisfied with a result of the re-executed processing, he/she cancels the job flow. For example, the read document and the processed product are discarded, and the member is not charged for the processing. Unless the member accepts the processing result, he/she is unable to obtain the read document and the processed product (OCR result).

13. If the member accepts the processing result, the job flow control service 11 adds the fee accepted by the member to the wallet 16.

14. If the user accepts the processing result, the job flow control service 11 stores the result of the job flow in the storage 17, which is an online storage.

15. After having accepted the processing result, the member accesses the document and data stored in the storage 17 to obtain the result.

The company providing the job flow service recovers the cost from the client company with a registered payment method at a closing date, such as the end of the month, based on the cumulative amount of the wallet 16.

Figure 8:
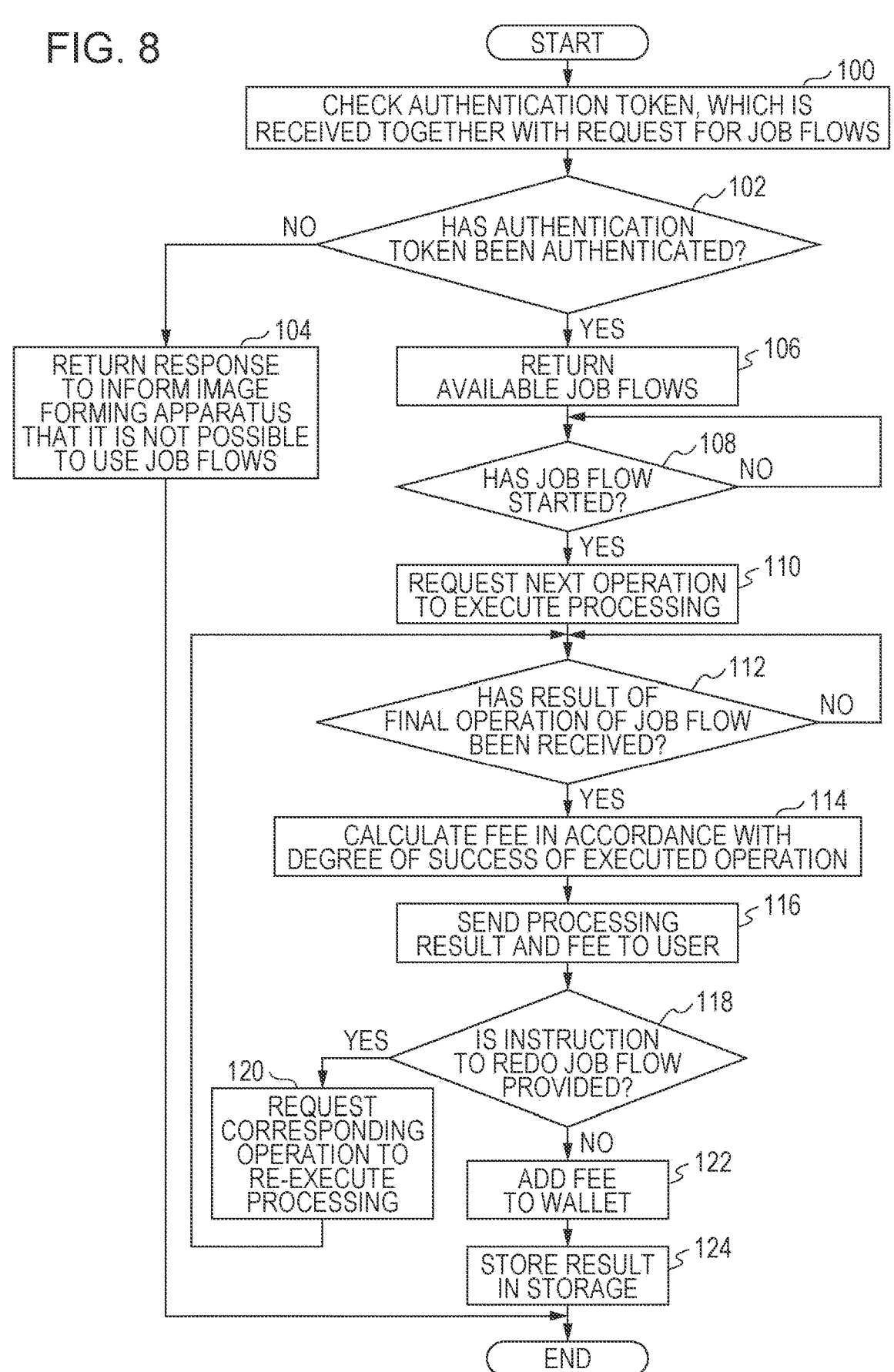
FIG. 8 is a flowchart illustrating an example of a procedure of processing executed by a cloud server, which provides a job flow service, in the information processing system according to the exemplary embodiment.

A description will be given below of an example of specific processing executed by the cloud server 18, which provides the job flow control service 11, in the information processing system 10 according to the exemplary embodiment. FIG. 8 is a flowchart illustrating an example of a procedure of processing executed by the cloud server 18. It is assumed that the processing shown in FIG. 8 starts when the image forming apparatus 12 has sent a request for job flows to the job flow control service 11 after user authentication.

In step 100, the CPU 18A checks an authentication token, which is received together with a request for job flows, and then proceeds to step 102. More specifically, the CPU 18A checks with the authentication service 13 whether the authentication token received from the image forming apparatus 12 together with the request for available job flows linked with user information is an authenticated token.

In step 102, the CPU 18A determines whether the authentication token has been authenticated. The CPU 18A makes this determination according to, for example, whether information which verifies the integrity of the authentication token is received from the authentication service 13. If the result of step 102 is NO, the CPU 18A proceeds to step 104. If the result of step 102 is YES, the CPU 18A proceeds to step 106.

In step 104, the CPU 18A returns a response to inform the image forming apparatus 12 that it is not possible to use job flows and terminates the processing in FIG. 8.

In step 106, the CPU 18A returns available job flows to the image forming apparatus 12 and proceeds to step 108.

In step 108, the CPU 18A determines whether a job flow has started. The CPU 18A makes this determination according to, for example, whether a job flow and an option have been selected, a document used for the job flow has been read, and the job flow and a processed product have been received from the image forming apparatus 12. The CPU 18A waits until the result of step 108 becomes YES and then proceeds to step 110.

In step 110, the CPU 18A requests the next operation indicated by the job flow to execute the corresponding processing and then proceeds to step 112.

In step 112, the CPU 18A determines whether the result of the final operation of the job flow has been received. The CPU 18A waits until the result of step 112 becomes YES and then proceeds to step 114.

In step 114, the CPU 18A calculates a fee in accordance with the degree of success of the executed operation indicated by the operation result and then proceeds to step 116. For example, a fee for OCR processing has been preset in accordance with each degree of success, and the CPU 18A calculates a fee reflecting the degree of success of OCR processing.

In step 116, the CPU 18A sends the processing result and the calculated fee to a registered email of the user, for example, and then proceeds to step 118.

In step 118, the CPU 18A determines whether an instruction to redo the job flow is provided. If the result of step 118 is YES, the CPU 18A proceeds to step 120. If the user accepts the processing result and the result of step 118 becomes NO, the CPU 18A proceeds to step 122.

In step 120, the CPU 18A identifies which operation of the job flow that the user wants to redo and requests this operation to re-execute the processing. The CPU 18A then returns to step 112 and repeats the above-described steps.

In step 122, the CPU 18A adds the fee to the wallet 16 and then proceeds to step 124. Then, the payment can be made with a registered payment method at a closing date, such as the end of the month, based on the cumulative amount of the wallet 16.

In step 124, the CPU 18A stores the result of the job flow in the storage 17 and completes the processing in FIG. 8.

In the above-described exemplary embodiment, OCR processing has been explained as an example of a specific operation included in a job flow. However, the specific operation included in a job flow is not restricted to OCR processing. For instance, bitmap image recognition may be executed as an operation in a job flow, and the image recognition rate may be used as the degree of success and a fee may be calculated in accordance with the degree of success. Artificial intelligence (AI) image recognition may be executed to analyze an image.

Operations executed by the individual elements of the information processing system 10 according to the above-described exemplary embodiment may be implemented by any one of software, hardware, and a combination of software and hardware. Operations executed by the individual elements of the information processing system 10 may be stored in a storage medium as a program and be distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:
a processor configured to:
receive sequential processing to be executed, the sequential processing being processing for executing multiple preset operations which are related to each other;
send a request to execute an operation included in the received sequential processing and receive an execution result; and
calculate a fee, which is preset, in accordance with a degree of success of the executed operation indicated by the execution result and present the calculated fee.

(((2)))

The information processing apparatus according to (((1))), wherein the processor is configured to present the execution result and also present a screen for receiving an instruction to re-execute the sequential processing, cancel the sequential processing, or accept the execution result.

(((3)))

The information processing apparatus according to (((2))), wherein the processor is configured to present a proposed alternative if the execution result indicates that an operation included in the sequential processing has failed or partially succeeded.

(((4)))

The information processing apparatus according to (((3))), wherein the processor is configured to present the proposed alternative with a fee.

(((5)))

The information processing apparatus according to any one of (((1))) to (((4))), wherein the processor is configured to receive a correction made to the execution result and report content of the correction to a provider of the sequential processing.

(((6)))

The information processing apparatus according to (((5))), wherein the processor is configured to offer a discounted fee if the content of the correction is reported to the provider of the sequential processing.

(((7)))

An information processing system comprising:
the information processing apparatus according to any one of (((1))) to (((6))); and
a requesting device that requests the information processing apparatus to execute the sequential processing.

(((8)))

An information processing program for causing a computer to execute a process, the process comprising:
receiving sequential processing to be executed, the sequential processing being processing for executing multiple preset operations which are related to each other;
sending a request to execute an operation included in the received sequential processing and receiving an execution result; and
calculating a fee, which is preset, in accordance with a degree of success of the executed operation indicated by the execution result and presenting the calculated fee.

What is claimed is:

1. An information processing apparatus comprising:
a processor configured to:
receive sequential processing to be executed, the sequential processing being processing for executing a plurality of preset operations which are related to each other;
send a request to execute an operation included in the received sequential processing and receive an execution result;
calculate a fee, which is preset, in accordance with a degree of success of the executed operation indicated by the execution result and present the calculated fee; and receive a correction made to the execution result and report content of the correction to a provider of the sequential processing.

2. The information processing apparatus according to claim 1, wherein the processor is configured to present the execution result and also present a screen for receiving an instruction to re-execute the sequential processing, cancel the sequential processing, or accept the execution result.

3. The information processing apparatus according to claim 2, wherein the processor is configured to present a proposed alternative if the execution result indicates that an operation included in the sequential processing has failed or partially succeeded.

4. The information processing apparatus according to claim 3, wherein the processor is configured to present the proposed alternative with a fee.

5. The information processing apparatus according to claim 1 wherein the processor is configured to offer a discounted fee if the content of the correction is reported to the provider of the sequential processing.

6. An information processing system comprising:
the information processing apparatus according to claim 1; and
a requesting device that requests the information processing apparatus to execute the sequential processing.

7. An information processing method comprising:
receiving sequential processing to be executed, the sequential processing being processing for executing a plurality of preset operations which are related to each other;
sending a request to execute an operation included in the received sequential processing and receiving an execution result;
calculating a fee, which is preset, in accordance with a degree of success of the executed operation indicated by the execution result and presenting the calculated fee; and
receiving a correction made to the execution result and report content of the correction to a provider of the sequential processing.

8. A non-transitory computer readable medium storing a program causing a computer to execute a process, the process comprising:
receiving sequential processing to be executed, the sequential processing being processing for executing a plurality of preset operations which are related to each other;
sending a request to execute an operation included in the received sequential processing and receiving an execution result;
calculating a fee, which is preset, in accordance with a degree of success of the executed operation indicated by the execution result and presenting the calculated fee; and
receiving a correction made to the execution result and report content of the correction to a provider of the sequential processing.

* * * * *